(12) United States Patent
Jung

(10) Patent No.: US 8,020,718 B2
(45) Date of Patent: Sep. 20, 2011

(54) FILLER TUBE ASSEMBLY FOR VEHICLES

(76) Inventor: Ho Soon Jung, Ulsan (KR)

( * ) Notice: Subject to any disclaimer, the term of this patent is extended or adjusted under 35 U.S.C. 154(b) by 401 days.

(21) Appl. No.: 12/150,906

(22) Filed: May 1, 2008

(65) Prior Publication Data

US 2008/0277394 A1 Nov. 13, 2008

(30) Foreign Application Priority Data

May 7, 2007 (KR) .................. 10-2007-0043917

(51) Int. Cl.
*B65D 6/00* (2006.01)
*B65D 8/00* (2006.01)
*B65B 1/04* (2006.01)
*B65B 3/04* (2006.01)

(52) U.S. Cl. ...... 220/86.2; 220/4.14; 220/562; 141/286; 141/350

(58) Field of Classification Search ........... 220/4.14, 220/86.2, 562; 141/286, 350; 280/834
See application file for complete search history.

(56) References Cited

U.S. PATENT DOCUMENTS

| | | | | |
|---|---|---|---|---|
| 5,385,179 A * | 1/1995 | Bates et al. | .................. | 141/312 |
| 6,708,724 B2 * | 3/2004 | Morinaga | ..................... | 137/588 |
| 6,886,705 B2 * | 5/2005 | Souma et al. | ................ | 220/86.2 |
| 7,021,343 B2 * | 4/2006 | Okada et al. | .................. | 141/286 |
| 7,063,113 B2 * | 6/2006 | Ropert et al. | ................. | 141/350 |
| 7,343,942 B2 * | 3/2008 | O'Connell | ...................... | 141/46 |

* cited by examiner

*Primary Examiner* — Anthony Stashick
*Assistant Examiner* — Madison L Wright
(74) *Attorney, Agent, or Firm* — Ladas & Parry LLP

(57) ABSTRACT

A filler tube assembly for vehicles is disclosed. The filler tube assembly includes a fuel supply tube made of aluminum for injecting a fuel into a fuel tank of the vehicle, a gas circulation tube having one end coupled to a front end of the fuel supply tube and the other end coupled to the fuel tank, so as to circulate a gas when the fuel is supplied, a tube cap made of aluminum and fixed to the front end of the fuel supply tube, and a shutter fixed to an inner portion of the front end of the fuel supply tube to prevent reverse current of the fuel supplied in the fuel tank.

2 Claims, 2 Drawing Sheets

FILLER TUBE ASSEMBLY FOR VEHICLES

CROSS-REFERENCE TO RELATED APPLICATION

This application is based on and claims priority from Korean Patent Application No. 10-2007-43917, filed on May 7, 2007 in the Korean Intellectual Property Office, the disclosure of which is incorporated herein in its entirety by reference.

BACKGROUND OF THE INVENTION

1. Field of the Invention

The present invention relates to a filler tube assembly for vehicles which forms a passage for injecting a liquid fuel from a fuel injector to a fuel tank of a vehicle.

2. Description of the Prior Art

Vehicles generally are provided with fuel tanks for storing a fuel required for drive of the vehicle and supplying the fuel to an engine to drive the engine. A filler tube is installed on one side of the fuel tank, and serves as a passage for receiving a liquid fuel from a fuel injector (a filling gun) and hermetically transferring it to the fuel tank.

More specifically, the filler tube is a vehicular component for coupling the fuel injector to the fuel tank. Since the fuel for running vehicle engines is very volatile and thus explosive, the filler tube is a major safety component which should be designed and manufactured to prevent leakage of the fuel at a vehicle accident or overturn or due to long-term use.

Filler tubes currently manufactured at home and abroad at present are generally made of plastic or carbon steel. This material has limited the weight reduction of the vehicle, and contains hazardous substances in an environment. In addition, it leads to increase a manufacturing cost of the vehicle, because of increased plating material for corrosion resistance.

More specifically, a plastic filler tube has 3-Dimensional shape by extrusion blow molding, and is rigidly manufactured and applied to the vehicle. Since a large quantity of hydrocarbon gas penetrates the plastic, the filler tube should be subjected to fluorine coating process (fluorinate) which is expensive and harmful to environment and human body, so as to enhance the sealing performance against transmission of the hydrocarbon gas. As times of fuel injection are increased, the coating is worn and damaged by continuous flow of the fuel, so that the sealing performance against transmission of the hydrocarbon gas is significantly deteriorated.

In addition, since the carbon steel tube is relatively heavy, it runs against the tendency to make a body for a vehicle light, and the carbon steel tube contains substances harmful to an environment (for example, chlorine compound).

SUMMARY OF THE INVENTION

Accordingly, the present invention has been made to solve the above-mentioned problems occurring in the prior art while advantages achieved by the prior art are maintained intact.

One object of the present invention is to provide a filler tube assembly for vehicles which can reduce its weight in view of the lightness of the vehicles in a field of automotive industry.

Another object of the present invention is to provide a filler tube assembly for vehicles which prevents atmosphere contamination and increases a recycling rate in order to solve problems related to environment.

In order to accomplish these objects, there is provided a filler tube assembly for vehicles, according to the present invention, which includes a fuel supply tube made of aluminum for injecting a fuel into a fuel tank of the vehicle, a gas circulation tube having one end coupled to a front end of the fuel supply tube and the other end coupled to the fuel tank, so as to circulate a gas when the fuel is supplied, a tube cap made of aluminum and fixed to the front end of the fuel supply tube, and a shutter fixed to an inner portion of the front end of the fuel supply tube to prevent reverse current of the fuel supplied in the fuel tank.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 1:
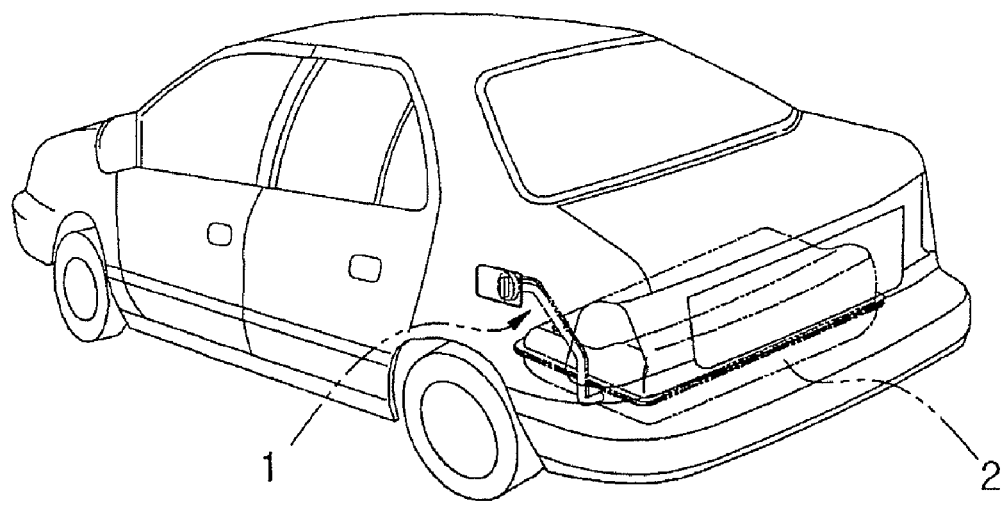
FIG. 1 is a perspective view illustrating a construction of fuel injection for vehicles according to the present invention.

FIG. 1 is a perspective view illustrating a construction of fuel injection including a filler tube assembly according to the present invention.

A fuel tank 2 is disposed in a proper position of a vehicle, and a line is connected to the fuel tank to feed a fuel to the driving part of the vehicle. Also, a filler tube assembly 1 is mounted on the fuel tank 2 to supply the fuel to the fuel tank 2 from an external fuel injector (not shown).

When the fuel is injected into a tube cap 30 through a fuel injector which is not shown in the drawings, the fuel flows to the fuel tank 2 along the passage of a fuel supply tube 10. In this instance, air existing in the fuel tank 2 is circulated from the fuel supply tube 10 to the fuel tank 2 through the passage of a gas circulation tube 20 by an amount of the fuel filled in the fuel tank.

Figure 2:
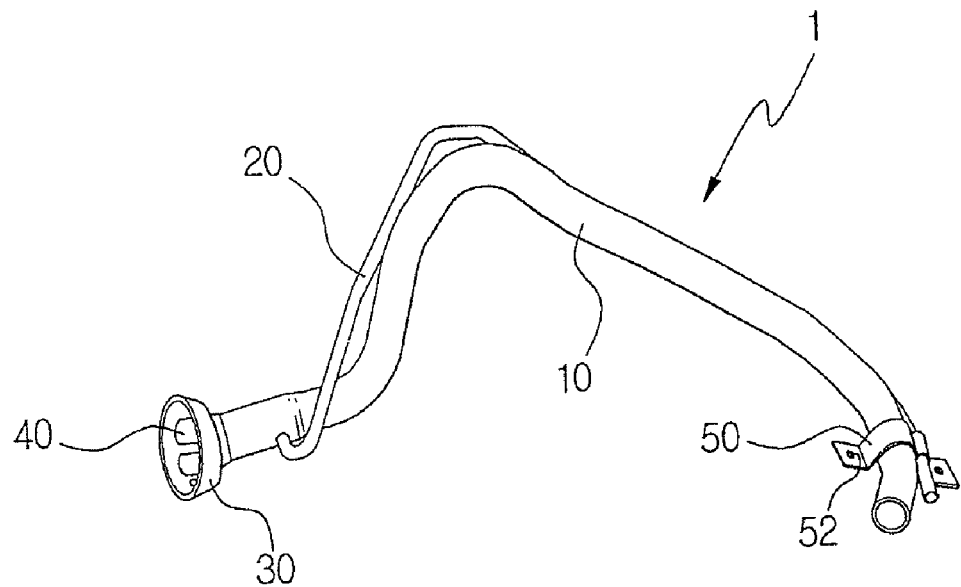
FIG. 2 is a perspective view illustrating a filler tube assembly according to the present invention.
Figure 3:
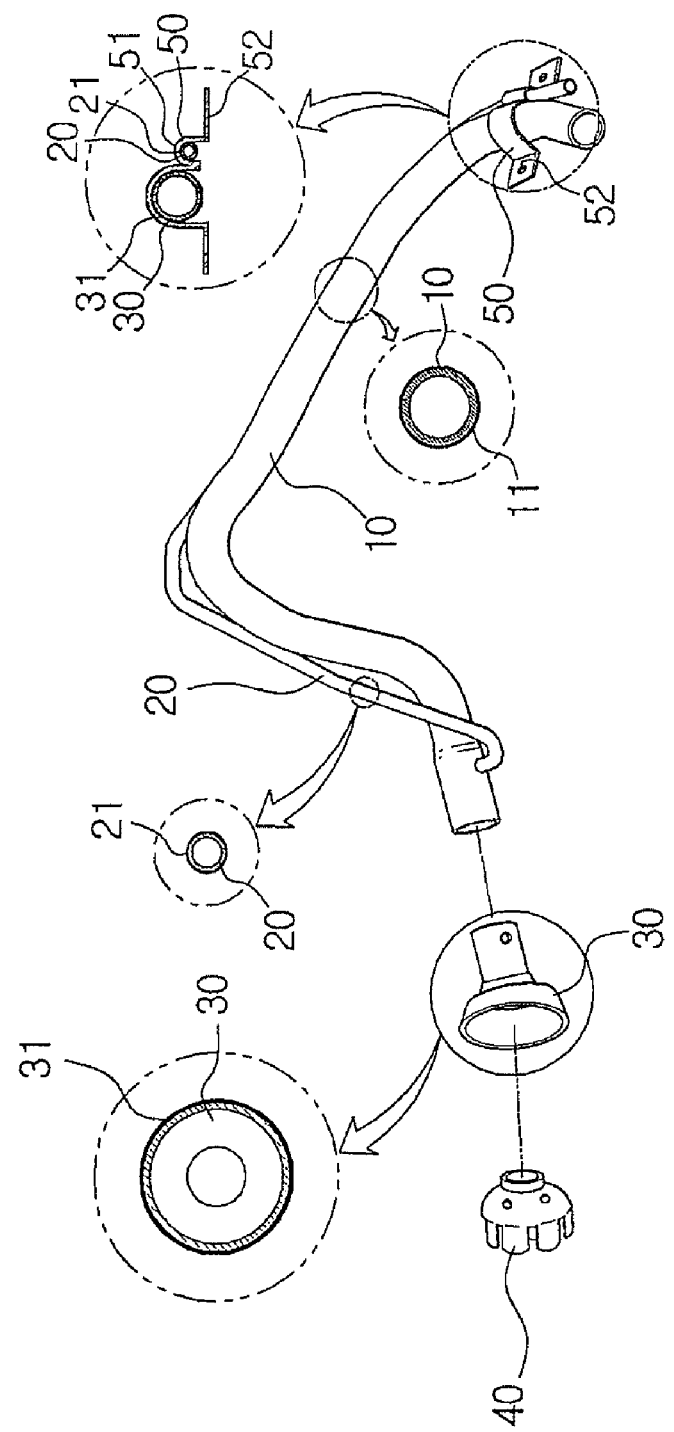
FIG. 3 is an exploded perspective view illustrating the filler tube assembly in FIG. 2.

FIGS. 2 and 3 show the appearance of the filler tube assembly according to the present invention.

The filler tube assembly 1 includes the fuel supply tube 10, the gas circulation tube 20, the tube cap 30, a shutter 40 and a bracket 50.

The fuel supply tube 10 is a tube having a desired diameter, and is adapted to couple a petrol cap of the vehicle to the fuel tank 2 to supply the fuel from the fuel injector to the fuel tank 2.

One end of the gas circulation tube 20 is connected to a front end of the fuel supply tube 10, and the other end is coupled to the fuel tank 2, so that the gas existing in the fuel tank 2 is circulated. The gas circulation tube 20 generally has a diameter smaller than that of the fuel supply tube. That is, recirculation of the gas is performed to prevent the pressure in the fuel tank 2 from being raised while the fuel is injected into the fuel supply tube 10 from the fuel injector.

The tube cap 30 is welded to the front end of the fuel supply tube 10 to easily supply the fuel from the fuel injector and easily couple the filler tube assembly 1 to the body of the vehicle.

In order to prevent reverse current of the fuel supplied in the fuel tank 10, the shutter 40 is fixed to an inner portion of the front end of the fuel supply tube 30 so that the shutter is positioned in the interior of the tube cap 30.

The bracket 50 is adapted to fix the fuel supply tube 10 to the body of the vehicle, and is provided at both ends thereof with screw holes 52 fastened with fastening members, such as a screw.

In this embodiment, the fuel supply tube 10, the gas circulation tube 20, the tube cap 30, and the bracket 50 are made of aluminum, respectively. Since specific gravity of the aluminum is about ⅓ lower than that of general carbon steel, the present invention can significantly reduce the weight of the body as compared with the existing filler tube made of carbon steel.

The aluminum is reacted with oxygen contained in the air to create an aluminum oxide film having good corrosion resistance on the exposed surface of the aluminum to protect itself, while the aluminum is left alone. As a result, since the aluminum becomes a material having corrosion resistance in the atmosphere, there is no red rust, such as steel, or green rust, such as copper or copper alloy.

In addition, the present invention can prevents generation of endocrine disrupter which is resulted from a filler tube made of PVC material. Also, the present invention can maintain the economical value in case of the disuse, since the aluminum has good recycling.

In this embodiment, anodized aluminum oxide films 11, 21, 31 and 51 are formed on the surfaces of the fuel supply tube 10, the gas circulation tube 20, the tube cap 30 and the bracket 50 by anodizing.

More specifically, since a general filler tube made of aluminum has hardness lower than that of a filler tube made of carbon steel (Brinell hardness of 99.85% aluminum is 16.1), dent or flaws are likely produced on the surface. Consequently, when the anodized aluminum oxide films are formed on the surfaces by the anodizing to increase the surface hardness, it makes up for the above drawbacks and thus ensures the corrosion resistance and impact resistance.

In aluminum anodization which is different from general electroplating, in which a metal part serves a cathode, an aluminum oxide layer is made thicker by passing a direct current through an acid solution, with the aluminum part serving as an anode. The current releases hydrogen at a cathode and oxygen at the surface of the aluminum anode, crating build-up of aluminum oxide. The anodizing is a compound word of anode and oxidizing, which will not be described herein in detail because of the known art.

The shutter 40 is made of a synthetic resin, which is different from other components of the filler tube assembly 1. Consequently, the shutter 40 may be easily assembled to the filler tube assembly by applying an adhesive to adhering surfaces and bonding the adhering surfaces, without directly welding the shutter 40 to the tub cap 30.

With the above construction, since the fuel supply tube, the gas circulation tube, the tube cap and the bracket which configure the filler tube assembly are made of aluminum, they are easily manufactured. Also, as compared with a general filler tube assembly made of plastic, the present invention does not create environmental problems, and remarkably reduces the weight relative to the carbon steel.

In addition, the anodized aluminum oxide films are formed on the fuel supply tube, the gas circulation tube, the tube cap and the bracket by anodizing, the present invention can increase the surface hardness thereof.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A filler tube assembly for vehicles, comprising:
    a fuel supply tube made of aluminum for injecting a fuel into a fuel tank of the vehicle;
    a gas circulation tube having one end coupled to a front end of the fuel supply tube and the other end coupled to the fuel tank, so as to circulate a gas when the fuel is supplied;
    a tube cap made of aluminum and fixed to the front end of the fuel supply tube; and
    a shutter fixed to an inner portion of the front end of the fuel supply tube to prevent reverse current of the fuel supplied in the fuel tank; and
    wherein anodized aluminum oxide films are formed on the surfaces of the fuel supply tube, the gas circulation tube, and the tube cap by anodizing.

2. The filler tube assembly of claim 1, wherein the shutter is made of plastic, and is adhered to an inner periphery of the fuel supply tube by an adhesive.

* * * * *